US010671461B2

(12) United States Patent
Scanlon et al.

(10) Patent No.: US 10,671,461 B2
(45) Date of Patent: *Jun. 2, 2020

(54) MEDIATING INTERACTIONS AMONG SYSTEM AGENTS AND SYSTEM CLIENTS

(71) Applicant: Disney Enterprises, Inc., Burbank, CA (US)

(72) Inventors: Raymond J. Scanlon, Burbank, CA (US); Douglas A. Fidaleo, Canyon Country, CA (US); Robert P. Michel, Toluca Lake, CA (US); Daniel C. Pike, Burbank, CA (US); Jordan K. Weisman, Bellevue, WA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/514,440

(22) Filed: Jul. 17, 2019

(65) Prior Publication Data

US 2019/0340044 A1    Nov. 7, 2019

Related U.S. Application Data

(63) Continuation of application No. 15/842,637, filed on Dec. 14, 2017, now Pat. No. 10,402,240.

(51) Int. Cl.
*G06F 9/54* (2006.01)
*G06Q 30/00* (2012.01)

(52) U.S. Cl.
CPC .......... *G06F 9/546* (2013.01); *G06Q 30/016* (2013.01)

(58) Field of Classification Search
CPC ................................... G06F 9/4862
USPC ...................................... 719/317
See application file for complete search history.

*Primary Examiner* — Andy Ho
(74) *Attorney, Agent, or Firm* — Farjami & Farjami LLP

(57) ABSTRACT

A system for mediating interactions among system agents and system clients includes a computing platform having a hardware processor and a system memory storing an interaction cueing software code including decision trees corresponding to storylines. The hardware processor executes the interaction cueing software code to receive interaction data corresponding to an interaction of a system client with a first system agent, identify a storyline for use in guiding subsequent interactions with the system client based on the interaction data, and store the interaction data and data identifying the storyline in a client profile assigned to the system client. The interaction cueing software code further determines an interaction cue or cues for coaching the same or another system agent in a second interaction with the system client based on the interaction data and a decision tree corresponding to the storyline, and transmits the interaction cue(s) to the system agent.

20 Claims, 4 Drawing Sheets

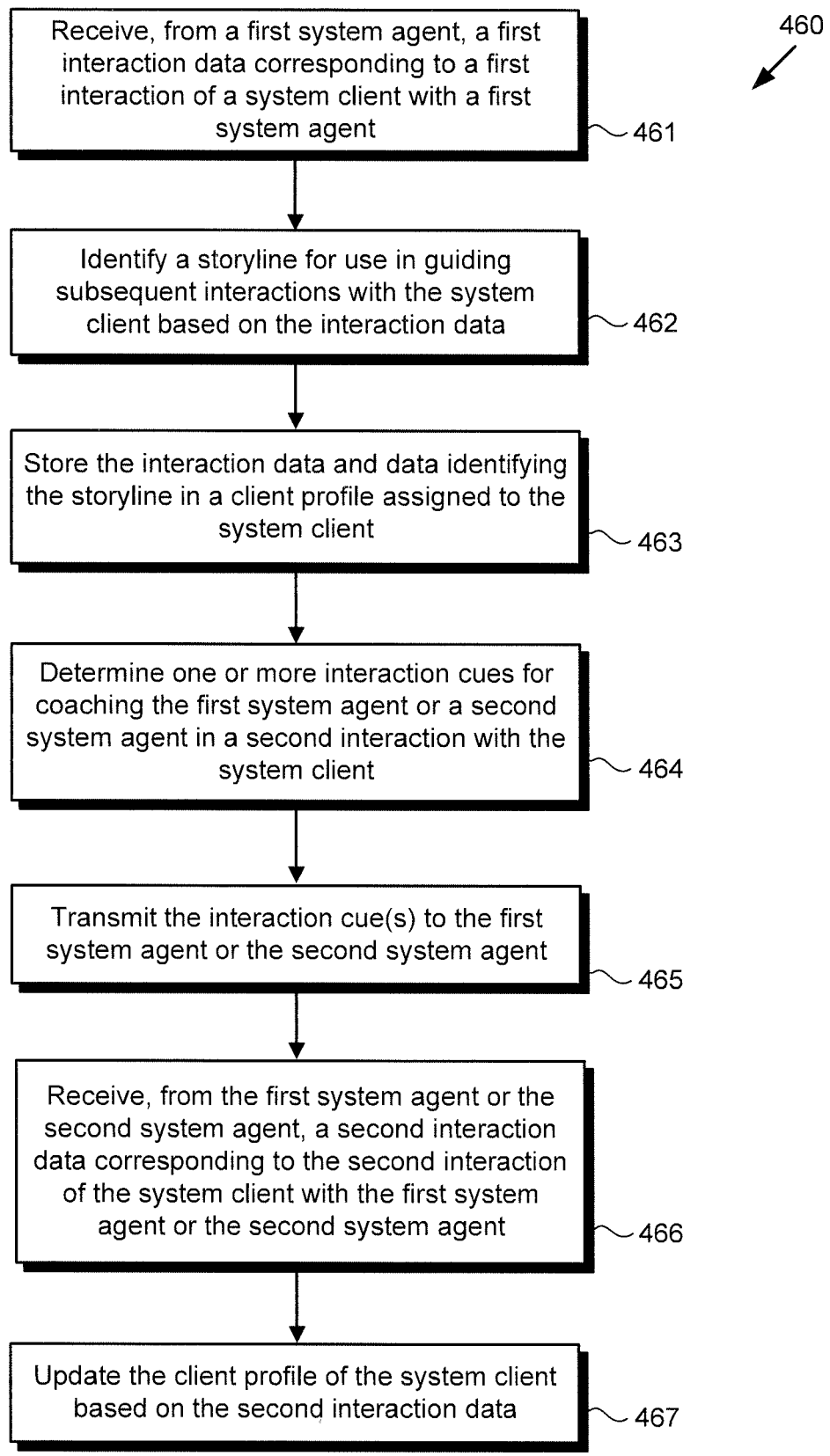

MEDIATING INTERACTIONS AMONG SYSTEM AGENTS AND SYSTEM CLIENTS

The present application is a Continuation of U.S. application Ser. No. 15/842,637, filed Dec. 14, 2017, which is hereby incorporated by reference in its entirety into the present application.

BACKGROUND

Interactive presentations, such as participatory stories, for example, have the potential to offer immersive experiences in which audience members can create or influence a dramatic plot through their own speech and/or actions. In contrast to participatory stories, in which a primary goal is to draw audience members into a dramatized world in which their participation becomes an integral part of the evolution of the storyline, even affecting its outcome, traditional linear narratives provide relatively few opportunities for audience participation to influence events within a story.

However, conventional approaches to producing and directing interactive presentations such as participatory stories have failed to overcome the challenges posed by the creation of content having a complex narrative structure while concurrently enabling significant participation by audience members. The limitations on audience participation imposed on conventionally produced interactive presentations exist because the authoring complexity of such presentations grows rapidly with the number of different story arcs and the number of interaction possibilities. As a result, conventionally produced interactive presentations tend to provide either strong narrative experiences with limited opportunities for audience participation, or compelling interactive experiences having simple narrative structures, but fails to provide interactive presentations that are both narratively complex and highly interactive.

SUMMARY

There are provided systems and methods for mediating interactions among system agents and system clients, substantially as shown in and/or described in connection with at least one of the figures, and as set forth more completely in the claims.

BRIEF DESCRIPTION OF THE DRAWINGS

FIG. 4 is a flowchart presenting an exemplary method for use by a system to mediate interactions among system agents and system clients.

DETAILED DESCRIPTION

Figure 1:
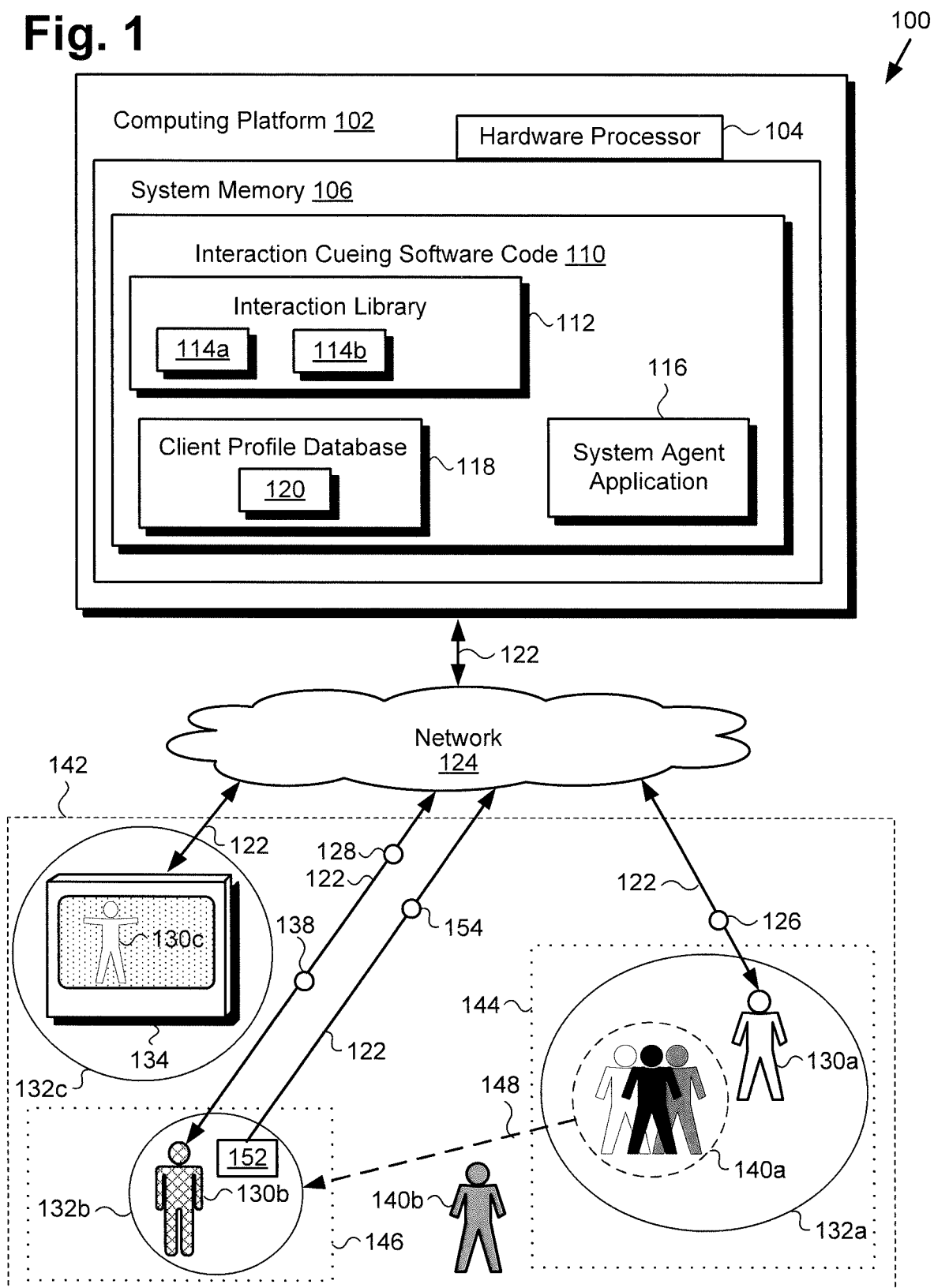
FIG. 1 shows a diagram of an exemplary system for mediating interactions among system agents and system clients, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As stated above, interactive presentations, such as participatory stories, for example, have the potential to offer immersive experiences in which audience members can create or influence a dramatic plot through their speech and/or actions. In contrast to participatory stories, in which a primary goal is to draw audience members into a dramatized world in which their participation becomes an integral part of the evolution of the storyline, even affecting its outcome, traditional linear narratives provide relatively few opportunities for audience participation to influence events within a story.

As further stated above, conventional approaches to producing and directing interactive presentations such as participatory stories have failed to overcome the challenges posed by the creation of content having a complex narrative structure while concurrently enabling significant participation by audience members. The limitations on audience participation imposed on conventionally produced interactive presentations exist because the authoring complexity of such presentations grows rapidly with the number of different story arcs and the number of interaction possibilities. As a result, conventionally produced interactive presentations tend to provide either strong narrative experiences with limited opportunities for audience participation, or compelling interactive experiences having simple narrative structures, but fails to provide interactive presentations that are both narratively complex and highly interactive.

The present application addresses and overcomes the deficiencies in the conventional art by disclosing systems and methods for mediating interactions among system agents and system clients. By identifying a storyline for use in guiding interactions with a system client based on an initial interaction of the system client with a system agent, the present solution enables the spontaneous generation of an interactive experience that evolves coherently from the initial interaction. Moreover, by determining interaction cues for coaching the first system agent or other system agents in subsequent interactions with the system client based on the first interaction and a decision tree corresponding to the storyline, the present solution ensures that those subsequent interactions are consistent with and relevant to the interaction history of the system client.

It is noted, that as defined for the purposes of the present application, the expression "system client" refers to a user/participant or to a group of user/participants in an interactive experience, other than a single or multi-player video game, that is mediated and directed by the systems and according to the methods disclosed herein. Thus, a system client may refer to an individual person, such as an audience member of a participatory story, or a group of individual persons, such as the entire audience or some subset of the audience of the participatory story.

It is also noted, that as further defined for the purposes of the present application, the expression "system agent" refers to a human, automated, or virtual agent, other than a gaming platform, in interactive communication with the systems disclosed herein, and actively guided or cued by those systems. Thus, in some implementations, a system agent may refer to a human agent, such as an actor portraying a character included in a storyline. Alternatively, in some implementations, a system agent may refer to an automated agent, such as a virtual character or a machine. In yet other implementations, a system agent may refer to a virtual entity having no physical manifestation but influencing the actions, demeanor, and/or dialog of other system agents. As a specific example of such latter implementations, a system agent might take the form of a virtual director that provides additional prompts or guidance to system agents in order to enhance the realism and immersiveness of their interactions with one another or with system clients.

FIG. 1 shows a diagram of exemplary system 100 for mediating interactions among system agents and system clients, according to one implementation. System 100 includes computing platform 102 having hardware processor 104 and system memory 106 storing interaction cueing software code 110. As shown in FIG. 1, interaction cueing software code 110 includes interaction library 112 of decision trees 114a and 114b, system agent application 116, and client profile database 118 including client profile 120. In addition, FIG. 1 shows one or more sensor(s) 152, human system agent 130a, and automated system agents 130b and 130c depicted, respectively, as a robotic machine and a virtual character or avatar. As further shown in FIG. 1, one or more sensor(s) 152 and system agents 130a, 130b, and 130c are in communication with computing platform 102 via communication network 124 and network communication links 122.

Also shown in FIG. 1 are system clients 140a and 140b depicted respectively as a group of individual persons and a single individual person. In addition, FIG. 1 shows interaction site 132a located in venue 144, interaction site 132b located in venue 146, and interaction site 132c including display 134 for presenting system agent 130c, as well as travel arrow 148 representing movement of system client 140a from interaction site 132a to interaction site 132b. Further shown in FIG. 1 are interaction data 126 (hereinafter "first interaction data 126"), one or more interaction cue(s) 128, interaction data 138 (hereinafter "second interaction data 138"), location data 154, and common venue 142 including venue 144, venue 146, and interaction site 132c.

According to the implementation shown in FIG. 1, system agents 130a, 130b, and 130c may be in communication with one another, as well as with computing platform 102, over communication network 124. In one such implementation, system 100 may correspond to one or more web servers, accessible over a packet-switched network such as the Internet, for example. Alternatively, system 100 may correspond to one or more servers supporting a local area network (LAN), or included in another type of limited distribution network.

Decision trees 114a and 114b of interaction library 112 correspond respectively to storylines for use in guiding interactions between one or more of system agents 130a, 130b, and 130c, and one or more of system clients 140a and 140b. Moreover, although FIG. 1 depicts interaction library 112, system agent application 116, and client profile database 118 of interaction cueing software code 110 as being mutually co-located in system memory 106, that representation is merely provided as an aid to conceptual clarity. More generally, system 100 may include one or more computing platforms 102, such as computer servers for example, which may be co-located, or may form an interactively linked but distributed system, such as a cloud based system, for instance. As a result, hardware processor 104 and system memory 106 may correspond to distributed processor and memory resources within system 100. Thus, it is to be understood that interaction library 112 and/or system agent application 116 and/or client profile database 118 may be stored remotely from one another within the distributed memory resources of system 100.

It is noted that one or more sensor(s) 152 of system 100 may include radio-frequency identification (RFID) sensor(s), facial recognition (FR) sensor(s), voice sensor(s), object recognition (OR) sensor(s), and/or any suitable sensor(s) for detecting the presence of system client 140a and/or 140b at an interaction site, such as interaction site 132b. It is further noted that display 134 may take the form of a liquid crystal display (LCD), a light-emitting diode (LED) display, an organic light-emitting diode (OLED) display, or another suitable display screen that performs a physical transformation of signals to light.

Figure 2:
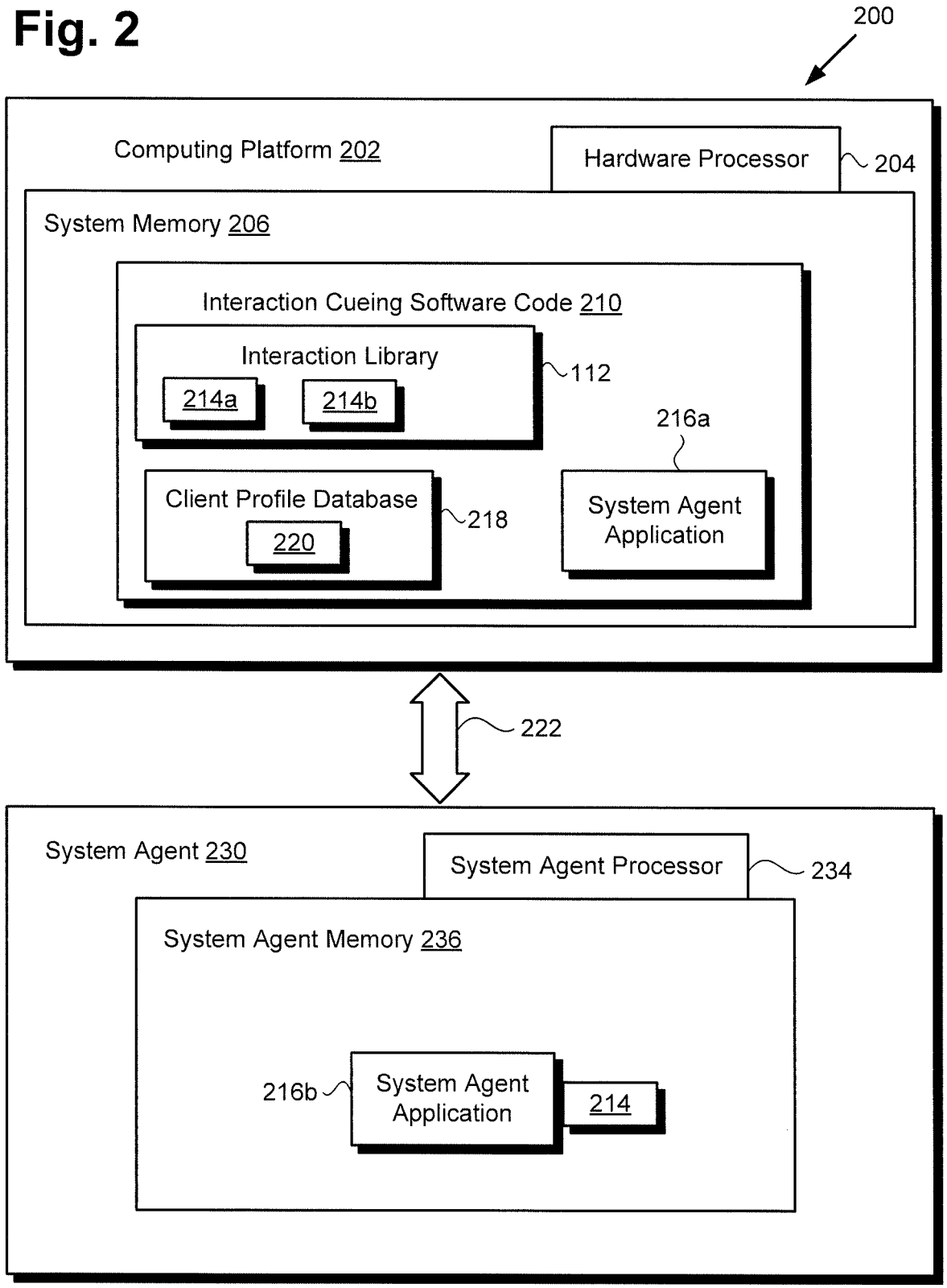
FIG. 2 shows another exemplary implementation of a system for mediating interactions among system agents and system clients.

FIG. 2 shows another exemplary implementation of system 200 for mediating interactions among system agents and system clients, in combination with a more detailed exemplary representation of system agent 230. System 200 includes computing platform 202, which is shown to be interactively coupled to system agent 230 over network communication link 222. Computing platform 202 includes hardware processor 204, and system memory 206 storing interaction cueing software code 210. As shown in FIG. 2, interaction cueing software code 210 includes interaction library 212 of decision trees 214a and 214b, system agent application 216a, and client profile database 218 including client profile 220. As further shown in FIG. 2, system agent 230 includes system agent processor 234, implemented as a hardware processor, and system agent memory 236 storing system agent application 216b and decision tree 214.

Network communication link 222, and system 200 including computing platform 202 having hardware processor 204 and system memory 206, correspond in general to network communication link 122, and system 100 including computing platform 102 having hardware processor 104 and system memory 106, in FIG. 1, and those corresponding features may share any of the characteristics attributed to either corresponding feature by the present disclosure. In addition, interaction cueing software code 210 including interaction library 212 of decision trees 214a and 214b, system agent application 216a, and client profile database 218 including client profile 220, in FIG. 2, corresponds in general to interaction cueing software code 110 including interaction library 112 of decision trees 114a and 114b, system agent application 116a, and client profile database 118 including client profile 120, in FIG. 1. In other words, interaction cueing software code 210 and corresponding interaction cueing software code 110 may share any of the characteristics attributed to either corresponding feature by the present disclosure.

System agent 230 corresponds in general to any automated agent of system 100/200, such as automated agents 130b and 130c in FIG. 1. In addition, system agent 230 may take the form of a communication device worn or carried by human system agent 130a, such as a headset or smart microphone, for example. Consequently, automated system agents 130b and 130c may be referred to as respective system agents 130b/230 and 130c/230 below, while human system agent 130a may be referred to as system agents 130a/230 below. Moreover, system agent application 216b corresponds to system agent application 116/216a, while decision tree 214 may correspond to either of decision tree 114a/214a or decision tree 114b/214b.

According to the exemplary implementation shown in FIG. 2, decision tree 214 and system agent application 216b are located in system agent memory 236, having been received from system 200 via network communication link 222. In one implementation, network communication link 222 corresponds to transfer of decision tree 214 and system agent application 216b over a packet-switched network, for example, or over a LAN. Once transferred, for instance by being downloaded over network communication link 222, system agent application 216b may be persistently stored in system agent memory 236 and may be executed locally on system agent 230, by system agent processor 234, to access and utilize decision tree 214.

System agent processor 234 may be the central processing unit (CPU) for system agent 230, for example, in which role system agent processor 234 runs the operating system for system agent 230 and executes system agent application 216b. In the exemplary implementation of FIG. 2, system agent 130a/130b/130c/230 can utilize system agent application 216b to communicate with interaction cueing software code 110/210 so as to provide first and/or second interaction data 126 and 138, and/or to receive one or more interaction cue(s) 128.

Figure 3:
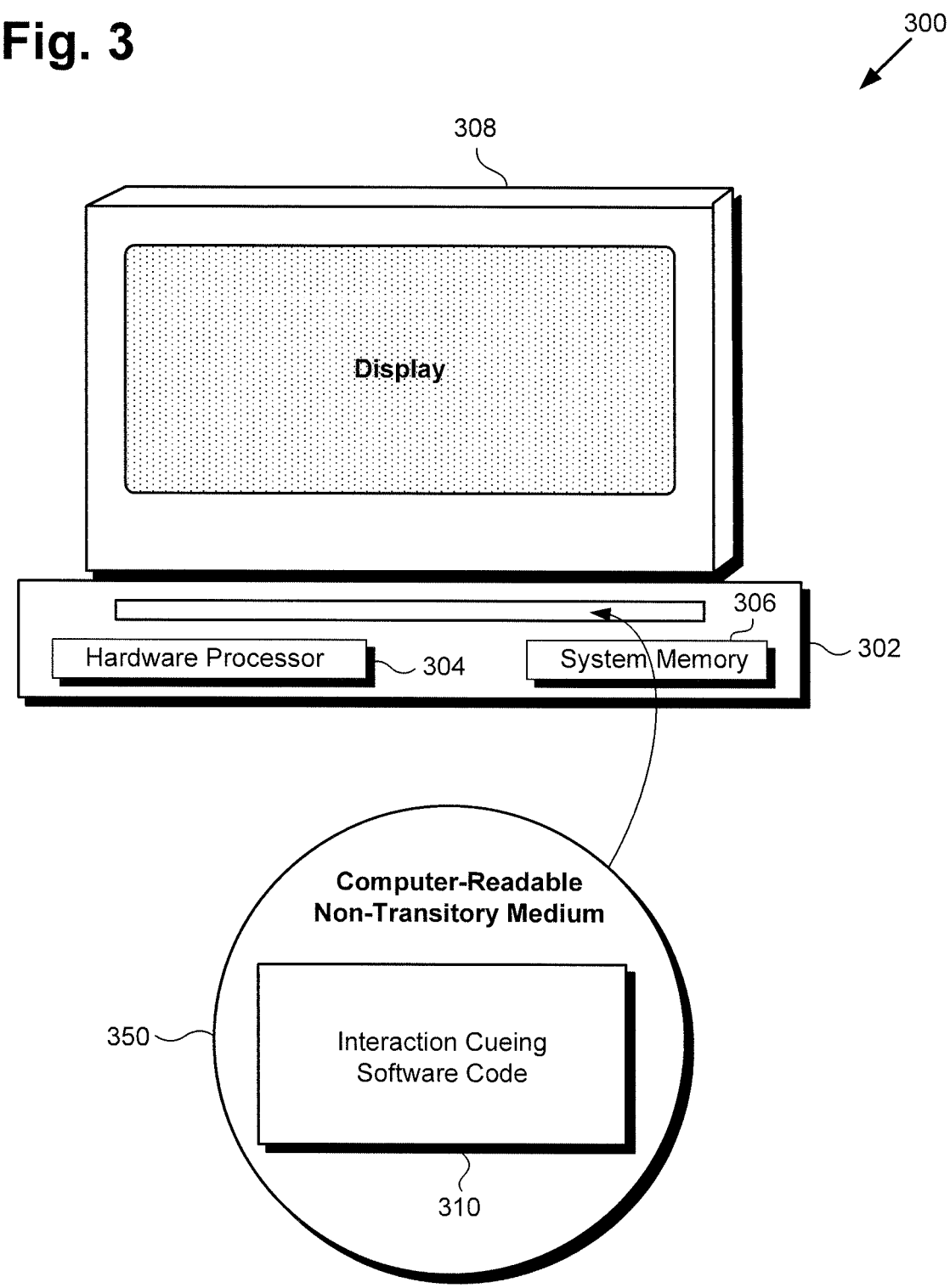
FIG. 3 shows an exemplary system and a computer-readable non-transitory medium including instructions for mediating interactions among system agents and system clients.

FIG. 3 shows exemplary system 300 and a computer-readable non-transitory medium including instructions for mediating interactions among system agents and system clients, according to one implementation. System 300 includes computing platform 302 having hardware processor 304 and system memory 306, interactively linked to display 308. Display 308 may take the form of an LCD, an LED display, an OLED display, or another suitable display screen that performs a physical transformation of signals to light. System 300 including computing platform 302 having hardware processor 304 and system memory 306 corresponds in general to system 100/200 including computing platform 102/202 having hardware processor 104/204 and system memory 106/206, in FIG. 1/2, and those corresponding features may share the characteristics attributed to any of the corresponding features by the present disclosure.

Also shown in FIG. 3 is computer-readable non-transitory medium 350 having interaction cueing software code 310 stored thereon. The expression "computer-readable non-transitory medium," as used in the present application, refers to any medium, excluding a carrier wave or other transitory signal, that provides instructions to hardware processor 304 of computing platform 302. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

According to the implementation shown in FIG. 3, computer-readable non-transitory medium 350 provides interaction cueing software code 310 for execution by hardware processor 304 of system 300. Interaction cueing software code 310 corresponds in general to interaction cueing software code 110/210, in FIG. 1/2, and is capable of performing all of the operations attributed to those corresponding features by the present application.

The systems for mediating interactions among system agents and system clients discussed above by reference to FIGS. 1, 2, and 3, will be further described below with reference to FIG. 4. FIG. 4 presents flowchart 460 outlining an exemplary method for use by a system to mediate interactions among system agents and system clients. It is noted that for merely exemplary purposes, human system agent 130a/230 will be referred to as "first system agent 130a/230" and automated system agent 130b/230 will be referred as "second system agent 130b/230" in the description of flowchart 460 below. It is further noted that interaction site 132a will be referred to as "first interaction site 132a" and that interaction site 132b will be referred as "second interaction site 132b" in the following description.

In addition, it is emphasized that the exemplary method outlined by flowchart 460 may be executed substantially concurrently for multiple interaction threads corresponding to interactions among system agents and system clients. That is to say, the method outlined by flowchart 460 may be executed substantially concurrently for each of tens, hundreds, or thousands of individual system clients corresponding to system client 140a.

Flowchart 460 begins with receiving, from first system agent 130a/230, first interaction data 126 corresponding to a first interaction of system client 140a with first system agent 130a/230 (action 461). First interaction data 126 may be received by interaction cueing software code 110/210/310 of system 100/200/300, executed by hardware processor 104/204/304. As shown in FIGS. 1 and 2, first interaction data 126 may be received by interaction cueing software code 110/210/310 from system agent application 216b of first system agent 130a/230 via communication network 124 and network communication links 122/222.

First interaction data 126 may include a wide variety of descriptive data depending in part on the type of interaction engaged in by system client 140a and first system agent 130a/230. For example, in one implementation, the first interaction may be a participatory or non-participatory theatrical performance by first system agent 130a/230, to which system client 140a is a participant and/or observer. In such an implementation, first interaction data 126 may include a description of verbal and non-verbal messages communicated by first system agent 130a/230 in the course of the performance, as well as the participatory content contributed through interaction by system client 140a.

Alternatively, or in addition, first interaction data 126 may include data describing system client 140a, such as a general appearance of system client 140a, a unique but personally anonymous identifier, such as an RFID tag carried by system client 140a, or a visually distinctive article or item worn or carried by system client 140a. However, it is noted that first interaction data 126 collected and retained by interaction cueing software code 110/210/310 of system 100/200/300 is exclusive of personally identifiable information (PII) of system clients with whom system agents interact. Thus, although interaction cueing software code 110/210/310 is typically able to distinguish an anonymous user with whom a previous interaction has occurred from anonymous users having no previous interaction experience with a system agent, system 100/200/300 is not configured to retain information describing the age, gender, race, ethnicity, or any other PII of any system client.

As other merely exemplary use cases, first interaction data 126 may correspond to a question posed by system client 140a to first system agent 130a/230, as well as, in some instances, to information provided by first system agent 130a/230, either spontaneously, or in response to such a question. In some implementations, as shown in FIG. 1, system client 140a may be a group of individual persons rather than a single individual, such as individual system client 140b. In those implementations, flowchart 460 may include identifying system client 140a as a group of individual persons. For example, in some implementations, system client 140a may self-identify as a group.

Alternatively, hardware processor 104/204/304 may execute interaction cueing software code 110/210/310 to identify system client 140a as a group of individual persons based on some criteria. As a specific example, hardware processor 104/204/304 may execute interaction cueing software code 110/210/310 to identify system client 140a as a group based on co-location of the individual persons making up the group at first interaction site 132a during the first interaction. Alternatively, hardware processor 104/204/304 may execute interaction cueing software code 110/210/310 to identify system client 140a as a group dynamically, based on experience. For example, in one implementation, system client 140a may be identified as a group based on the close physical proximity of individuals that is detected a predetermined threshold number of times. For instance, close physical proximity of any two individual persons may refer to those individuals being less than one meter (1.0 m) apart from one another.

It is noted that, in implementations in which hardware processor 104/204/304 executes interaction cueing software code 110/210/310 to identify system client 140a as a group of individual persons, that identification may occur prior to, or as a result of, the s first interaction of system client 140a with first system agent 130a/230 described in action 461. That is to say, in some implementations, identification of system client 140a as a group of individual persons may precede action 461. Moreover, in such an implementation, the first interaction with system client 140a may correspond to an interaction by one or more members of the group with first system agent 130a/230. Once a group of individual persons is identified, the group may be treated monolithically by interaction cueing software code 110/210/310 when guiding subsequent interactions of system agents 130a/230, 130b/230, and/or 130c/230 with group system client 140a.

It is noted that, in some implementations, first interaction data 126 may include data describing first system agent 130a/230, such as a present state of first system agent 130a/230 resulting from one or more previous interactions with system clients or other system agents. For example, one or more previous interactions of first system agent 130a/230 with system clients other than system client 140a or with other system agents may result in first system agent 130a/230 being characterized by an emotional state corresponding to anger, or, conversely, happiness. In those implementations, first interaction data 126 may include data describing that initial emotional state of first system agent 130a/230, i.e., anger or happiness, during the first interaction of system client 140a with first system agent 130a/230.

It is further noted that, although not explicitly described by reference to flowchart 460, the method outlined by flowchart 460 may be readily adapted to interactions between system agents. Thus, in some implementations, a method analogous to the method outlined by flowchart 460 may begin with receiving, from first system agent 130a/230, first interaction data 126 corresponding to a first interaction of first system agent 130a/230 with another system agent.

Flowchart 460 continues with identifying, based on first interaction data 126, a storyline corresponding to one of decision trees 114a/214a and 114b/214b for use in guiding subsequent interactions with system client 140a (action 462). Identification of the storyline corresponding to decision tree 114a/214a or decision tree 114b/214b based on first interaction data 126 may be performed by interaction cueing software code 110/210/310 of system 100/200/300, executed by hardware processor 104/204/304, and utilizing interaction library 112/212.

In general, a storyline corresponding to one of decision trees 114a/214a and 114b/214b is a complex storyline authored in a way that is represented by a branching decision tree having two or more hierarchical layers, e.g., decision tree 114a/214a or decision tree 114b/214b. For instance, an overarching story-level decision tree 114a/214a or 114b/214b may encompass the entire storyline with multiple system agent performed interactions. Particular interactions between system agents and a system client or clients may be represented by interaction-level decision trees at branch leaves of story-level decision trees 114a/214a and 114b/214b. The interactions themselves can also be organized as trees to support system client interactivity. The interaction levels of decision trees 114a/214a and 114b/214b enable a system agent to implement a storyline consistently, while the respective story-levels of decision trees 114a/214a and 114b/214b enable the determination of interaction cue(s) 128 for achieving storyline goals for a particular interactive experience.

In some implementations, decision tree 114a/214a or 114b/214b, once its corresponding storyline is identified, can be run on computing platform 102/202/302 by interaction cueing software code 110/210/310 of system 100/200/300, executed by hardware processor 104/204/304. Alternatively, however, in some implementations, once a storyline corresponding to decision tree 114a/214a or 114b/214b has been identified by interaction cueing software code 110/210/310, decision tree 214 may be transferred to system agent 130a/130b/130c/230 via communication network 124 and network communication links 122/222. In such implementations, decision tree 214 can run locally on system agent 130a/130b/130c/230 using system agent application 216a, and may be updated remotely by interaction cueing software code 110/210/310.

Storylines corresponding respectively to decision trees 114a/214a/214 and 114b/214b/214 may take a variety of forms. For example, and as noted above, in one implementation, first interaction data 126 may include a description of verbal and non-verbal messages communicated by first system agent 130a/230 in the course of a participatory or non-participatory theatrical performance. In such an implementation, the storyline identified based on first interaction data 126 may correspond to the overall plot and/or script of a theatrical play. Moreover, in that implementation, first system agent 130a/230 may be an actor portraying a character included in the storyline identified in action 462.

However, in another merely exemplary implementation, the first interaction to which first interaction data 126 corresponds may be a sales pitch by first system agent 130a/230. In that implementation, the storyline identified based on first interaction data 126 may correspond to a sales strategy for guiding system client 140a through a purchase of the product or service to which the pitch is directed within venue 144 or common venue 142, either of which may be a retail venue, such as a retail complex including multiple retail outlets.

In yet other exemplary implementations, common venue 142 including first interaction site 132a, second interaction site 132b, and interaction site 132c may be a resort property or theme park, for example. In those implementations, the first interaction may be a first interactive experience in a serial participatory adventure including interactions at multiple interaction sites within common venue 142, such as most or all of first interaction site 132a, second interaction site 132b, and interaction site 132c. Conversely, in some implementations, first interaction site 132a, second interaction site 132b, and interaction site 132c may correspond to interaction sites located in different venues that are distinct from one another. For example, venue 144 may be a theme park, resort property, or retail complex located in one geographical location, while venue 146 may be another theme park, resort property, or retail complex located in another geographical location adjacent to or remote from venue 144.

Flowchart 460 continues with storing first interaction data 126 and data identifying the storyline for use in guiding subsequent interactions with system client 140a in client profile 120/220 assigned to system client 140a (action 463). The storing of first interaction data 126 and the data identifying the storyline in client profile 120/220 may be performed by interaction cueing software code 110/210/310 of system 100/200/300, executed by hardware processor 104/204/304.

Flowchart 460 continues with determining one or more interaction cue(s) 128 for coaching first system agent 130a/230 or second system agent 130b/230 in a second interaction with system client 140a (action 464). In some implementations, determination of one or more interaction cue(s) 128 for coaching first system agent 130a/230 or second system agent 130b/230 in a second interaction with system client 140a may be performed by interaction cueing software code 110/210/310 of system 100/200/300, executed by hardware processor 104/204/304. However, in other implementations, determination of one or more interaction cue(s) 128 may be performed by system agent application 216b of first system agent 130a/230 or second system agent 130b/230, executed by system agent processor 234. Nevertheless, in all implementations, one or more interaction cue(s) 128 are determined based on first interaction data 126 and decision tree 114a/214a/214 or 114b/214b/214 corresponding to the storyline identified in action 462.

In some implementations, system client 140a may remain at first interaction site 132a after the first interaction with first system agent 130a/230. For example, system client 140a may await a response to a question posed by system client 140a to first system agent 130a/230 in the first interaction. As another example, system client 140a may be contributing to an ongoing participatory theatrical presentation including first system agent 130a/230. In those implementations, one or more cue(s) 128 for coaching system agent 140a in responding to the question or participation by system client 140a may be determined.

Alternatively, in some implementations system client 140a may leave first interaction site 132a to travel to second interaction site 132b occupied by second system agent 130b/230 after the first interaction, as shown by travel arrow 148. In those implementations, one or more interaction cue(s) 128 may be determined for coaching system agent 130b in interacting with system client 140a at second interaction site 132b. In addition, in those implementations, hardware processor 104/204/304 may further execute interaction cueing software code 110/210/310 to receive, from one or more of sensor(s) 152 and/or second system agent 130b/230, location data 154 identifying system client 140a as being present at interaction site 132b.

It is emphasized that, regardless of whether one or more cue(s) 128 are determined for coaching first system agent 130a/230 or second system agent 130b/230, one or more cue(s) 128 are determined in order to ensure that a subsequent interaction between system client 140a and either of first system agent 130a/230 or second system agent 130b/230 is consistent with and evolves coherently from the first interaction of system client 140a with first system agent 130a/230.

Flowchart 460 continues with transmitting one or more interaction cue(s) 128 to first system agent 130a/230 or to second system agent 130b/230 (action 465). One or more interaction cue(s) 128 may be transmitted to first system agent 130a/230 or to second system agent 130b/230 by interaction cueing software code 110/210/310 of system 100/200/300, executed by hardware processor 104/204/304. As shown in FIGS. 1 and 2, interaction cue(s) 128 may be transmitted to first system agent 130a/230 or to second system agent 130b/230 via communication network 124 and network communication links 122/222.

Flowchart 460 continues with receiving, from first system agent 130a/230 or second system agent 130b/230, second interaction data 138 corresponding to the second interaction of system client 140a with first system agent 130a/230 or second system agent 130b/230 (action 466). Second interaction data 138 may be received by interaction cueing software code 110/210/310 of system 100/200/300, executed by hardware processor 104/204/304.

Second interaction data 138 corresponds in general to the types of data described by reference to first interaction data 126, above, and may share any of the characteristics attributed to first interaction data 126 by the present disclosure. As shown in FIGS. 1 and 2, second interaction data 138 may be received by interaction cueing software code 110/210/310 from system agent application 216b of first system agent 130a/230 or second system agent 130b/230 via communication network 124 and network communication links 122/222.

It is noted that when a system agent takes the form of an automated system agent, such as second system agent 130b/230 or system agent 130c/230, the automated system agent may be implemented as a physical object, such as a machine, or as a virtual object, such as an avatar or an animated character. For example, and as shown in FIG. 1, in some implementations, automated second system agent 130b may be a robotic machine, such as an animatronic robot, for example. Furthermore, and as also shown in FIG. 1, in some implementations, automated system agent 130c may be rendered as an image of a virtual character or avatar on display 134.

Flowchart 460 may conclude with updating client profile 120/220 based on second interaction data 138 (action 467). Updating of client profile 120/220 assigned to system client 140a may be performed by interaction cueing software code 110/210/310 of system 100/200/300, executed by hardware processor 104/204/304.

Although not included in exemplary flowchart 460, in some implementations, the present method may further include interaction cueing software code 110/210/310 being executed by hardware processor 104/204/304 to identify, based on second interaction data 138, a second storyline to replace the storyline for guiding interactions with system client 140a identified in action 462. In such implementations, hardware processor 104/204/304 may further execute interaction cueing software code 110/210/310 to update client profile 120/220 based on data identifying the second, replacement, storyline.

In addition, in those implementations, hardware processor 104/204/304 may execute interaction cueing software code 110/210/310 to determine one or more other interaction cue(s) for coaching one of first system agent 130a/230, second system agent 130b/230, and system agent 130c/230 in a third interaction with system client 140a, as well as to transmit the one or more other interaction cue(s) to one of first system agent 130a/230, second system agent 130b/230, and system agent 130c/230. It is noted that, in implementations in which a second storyline replaces the first storyline, the one or more other interaction cue(s) may be determined based on first interaction data 126, second interaction data 138, and one of decision trees 114a/214a/214 and 114b/214b/214 corresponding to the second storyline.

Thus, the present application discloses systems and methods for mediating interactions among system agents and system clients. By identifying a storyline for use in guiding interactions with a system client based on an initial interaction of the system client with a system agent, the present solution enables the spontaneous generation of an interactive experience that evolves coherently from the initial interaction. Moreover, by determining interaction cues for coaching the first system agent or other system agents in subsequent interactions with the system client based on the first interaction and a decision tree corresponding to the storyline, the present solution advantageously ensures that those subsequent interactions are consistent with and relevant to the interaction history of the system client.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A venue for providing interactions with a plurality clients, the venue comprising:
   a plurality of interaction sites;
   at least one of a plurality of agents at one or more of the plurality of interaction sites;
   a computing platform including a hardware processor and a system memory; and
   an interaction cueing software code stored in the system memory, the interaction cueing software code including an interaction library of decision trees each corresponding respectively to one of a plurality of storylines;
   wherein the hardware processor is configured to execute the interaction cueing software code to:
      receive, from a first agent of the plurality of agents, a first interaction data corresponding to a first interaction of a first client of the plurality of clients with the first agent at a first interaction site of the plurality of interaction sites;
      identify, based on the first interaction data, a first storyline of the plurality of storylines for use in guiding subsequent interactions with the first client;
      determine at least one interaction cue for coaching one of the plurality of agents in a second interaction with the first client at one of the first interaction site or a second interaction site of the plurality of interaction sites; and
      transmit the at least one interaction cue to the one of the plurality of agents at the one of the first interaction site or the second interaction site;
   wherein the at least one interaction cue is determined based on the first interaction data and at least one decision tree of the decision trees, the at least one decision tree corresponding to the first storyline.

2. The venue of claim 1, wherein the hardware processor is further configured to execute the interaction cueing software code to: store the first interaction data and a first data identifying the first storyline in a first client profile assigned to the first client.

3. The venue of claim 2, wherein the hardware processor is further configured to execute the interaction cueing software code to:
   receive, from the one of the plurality of agents, a second interaction data corresponding to the second interaction of the first client with the one of the plurality of agents; and
   update the first client profile based on the second interaction data.

4. The venue of claim 3, wherein the hardware processor is further configured to execute the interaction cueing software code to:
   identify, based on the second interaction data, a second storyline of the plurality of storylines to replace the first storyline for guiding subsequent interactions with the first client;
   further update the first client profile based on a data identifying the second storyline;
   determine at least one other interaction cue for coaching one of the first agent, a second agent, or a third agent of the plurality of agents in a third interaction with the first client; and
   transmit the at least one other interaction cue to the one of the first agent, the second agent, or the third agent;
   wherein the at least one other interaction cue is determined based on the first interaction data, the second interaction data, and another at least one decision tree of the decision trees, the another at least one decision tree corresponding to the second storyline.

5. The venue of claim 1, wherein the first client comprises a group of individual persons.

6. The venue of claim 1, wherein at least one of the plurality of agents is a human agent.

7. The venue of claim 6, wherein the human agent is an actor portraying a character included in the first storyline.

8. The venue of claim 1, wherein at least one of the plurality of agents is an automated agent.

9. The venue of claim 8, wherein the automated agent comprises one of a virtual character and a machine.

10. The venue of claim 1, wherein the hardware processor is further configured to execute the interaction cueing software code to identify the first client as a group of individual persons based on co-location of the individual persons at the first interaction site.

11. A venue for providing interactions with a plurality clients, the venue comprising:
   a plurality of interaction sites;
   at least one of a plurality of agents at one or more of the plurality of interaction sites;
   a computing platform including a hardware processor and a system memory; and
   an interaction cueing software code stored in the system memory, the interaction cueing software code including an interaction library of decision trees each corresponding respectively to one of a plurality of storylines;
   wherein the hardware processor is configured to execute the interaction cueing software code to:
      identify a plurality of individual persons of the plurality of clients as a group;
      receive, from a first agent of the plurality of agents, a first interaction data corresponding to a first interaction of at least one individual person of the group with the first agent at a first interaction site of the plurality of interaction sites;

identify, based on the first interaction data, a first storyline of the plurality of storylines for use in guiding subsequent interactions with the group;

determine at least one interaction cue for coaching one of the first agent or a second agent of the plurality of agents in a second interaction with the group at one of the first interaction site or a first interaction site of the plurality of interaction sites; and transmit the at least one interaction cue to the one of the first agent or the second agent;

wherein the at least one interaction cue is determined based on the first interaction data and at least one decision tree of the plurality of decision trees, the at least one decision tree corresponding to the first storyline.

12. The venue of claim 11, wherein the hardware processor is further configured to execute the interaction cueing software code to: store the first interaction data and a first data identifying the first storyline in a first client profile assigned to the group.

13. The venue of claim 11, wherein the hardware processor is configured to execute the interaction cueing software code to identify the plurality of individual persons as constituting the group based on self-identification of the group by at least one of the plurality of individual persons.

14. The venue of claim 11, wherein the hardware processor is configured to execute the interaction cueing software code to identify the plurality of individual persons as constituting the group based on co-location of the plurality of individual persons at the first interaction site.

15. The venue of claim 11, wherein the hardware processor is configured to execute the interaction cueing software code to identify the plurality of individual persons as constituting the group based on a predetermined plurality of instances in which the plurality of individual persons are detected to be in close physical proximity to one another.

16. The venue of claim 11, wherein the hardware processor is configured to execute the interaction cueing software code to dynamically identify the plurality of individual persons as constituting the group based on an experience of the plurality of individual persons.

17. The venue of claim 11, wherein at least one of the first agent and the second agent is a human agent.

18. The venue of claim 17, wherein the human agent is an actor portraying a character included in the first storyline.

19. The venue of claim 11, wherein at least one of the first agent and the second agent is an automated agent.

20. The venue of claim 19, wherein the automated agent comprises one of a virtual character and a machine.

* * * * *